(12) United States Patent  
Richardson (10) Patent No.: US 6,502,806 B2  
(45) Date of Patent: Jan. 7, 2003

(54) LIQUID DISTRIBUTOR ASSEMBLY FOR USE IN PACKED COLUMN

(75) Inventor: Don Richardson, Fall River, KS (US)

(73) Assignee: Koch-Glitsch, Inc., Wichita, KS (US)

( * ) Notice: Subject to any disclaimer, the term of this patent is extended or adjusted under 35 U.S.C. 154(b) by 27 days.

(21) Appl. No.: 09/800,847

(22) Filed: Mar. 7, 2001

(65) Prior Publication Data

US 2001/0028121 A1 Oct. 11, 2001

Related U.S. Application Data

(60) Provisional application No. 60/187,876, filed on Mar. 8, 2000, now abandoned.

(51) Int. Cl.$^7$ .................................................. B01F 3/04

(52) U.S. Cl. ........................................ 261/97; 261/110

(58) Field of Search .............................. 261/97, 98, 99, 261/110, DIG. 44

(56) References Cited

U.S. PATENT DOCUMENTS

| | | | | |
|---|---|---|---|---|
| 3,392,966 A | * | 7/1968 | Eckert | 261/97 |
| 3,419,251 A | * | 12/1968 | Eckert | 261/98 |
| 4,557,877 A | * | 12/1985 | Hofstetter | 261/97 |
| 4,604,247 A | | 8/1986 | Chen et al. | |
| 4,839,108 A | * | 6/1989 | Silvey | 261/110 |
| 4,909,967 A | | 3/1990 | Binkley et al. | |
| 5,783,119 A | * | 7/1998 | Ulrich et al. | 261/97 |
| 5,884,658 A | * | 3/1999 | Cameron | 261/98 |

OTHER PUBLICATIONS

Bulletin KI–6 from Koch Engineering Company, Inc., Packed Tower Internals, pp. 10–11, Oct. 1990, 261/97.*  
Bulletin 22.51.06.40–V.91–50 from Sulzer Chemtech, Mellatech Column Internals—The Concept for Packed Columns, Fig. 1.1, p. 8, Oct. 1992, 261/97.*

* cited by examiner

Primary Examiner—C. Scott Bushey  
(74) Attorney, Agent, or Firm—Shook, Hardy & Bacon L.L.P.

(57) ABSTRACT

A flow distributor is provided for distributing liquid onto a packed bed of a process column. The distributor includes an elongated liquid trough having first and second laterally spaced, longitudinally extending sidewalls and a longitudinally extending floor which extends between and interconnects the sidewalls. The sidewalls each have a plurality of holes therethrough, which holes are spaced apart longitudinally of the distributor. The distributor also includes a respective elongated liquid distributor drainpipe for each of the holes. Each pipe has first and second ends and a central internal liquid conducting passageway extending therethrough between its ends. Each pipe also has a first segment adjacent its first end and a second segment spaced longitudinally of the pipe from the first end. The segments are angularly disposed relative to one another. The distributor also includes a respective connector assembly for each of the pipes. These connector assemblies are each configured for holding a corresponding pipe in a desired orientation with the passageway at the first end of the pipe in essential alignment with a respective hole, with the first segment of the pipe extending laterally and outwardly away from an outer surface of the respective sidewall to which the pipe is attached, and with the second segment of the pipe extending downwardly in outwardly spaced relationship relative to the outer surface of the sidewall.

37 Claims, 3 Drawing Sheets

LIQUID DISTRIBUTOR ASSEMBLY FOR USE IN PACKED COLUMN

REFERENCE TO RELATED APPLICATION

Priority is claimed in the present application pursuant to 35 U.S.C. § 119(e) from provisional application serial number 60/187,876 filed Mar. 8, 2000, now abandoned.

BACKGROUND OF THE INVENTION

1. Field of the Invention

The present invention relates to liquid distributors for vapor-liquid contact columns and, more particularly, to a liquid distributor assembly for packed columns wherein counter-current, vapor-liquid flow is employed.

2. The State of the Prior Art

It is well known in the prior art to utilize various types of exchange columns or towers, in which a gas and a liquid are brought into contact with one another, preferably in counter-current flow for purposes of mass and/or heat transfer, close fractionation and/or separation of feedstock constituents, and other unit operations. The overall process generally involves mass transfer, heat transfer, fluid vaporization and/or fluid condensation. To conduct these operations efficiently, intimate contact between the gas and the liquid must be achieved and yet the pressure drop within and the physical dimensions of the contact zone desirably is minimized. For these reasons, counter-current flow of vapor and liquid within the exchange column has become the preferred method for bringing the vapor and the liquid into the desired intimate contact. Moreover, the preferred means for achieving this desired contact is a so-called packed bed positioned within the column. Such beds are well known. Some are packed with a multiplicity of packing elements designed to maximize the vapor/liquid interface. Others may be in the form of a structured packing.

Liquid is distributed on top of these packed beds in the most feasible manner, while vapor is distributed beneath the beds in the lower regions of the column. In this manner, liquid trickling downwardly through the packing bed is spread out over the surfaces of the packing elements so as to maximize the surface area of the liquid that is exposed to vapor ascending through the bed.

It is well established that the configuration of the packing bed determines the pressure drop, efficiency of the vapor-liquid interface and the concomitant mass and energy transfer occurring in the process column. The means for effective and even distribution of the vapor and the liquid on opposite sides of the packing bed as well as maintenance of that distribution as the fluids move through the packing are critical to the efficient operation of the column. Only with efficient initial vapor and liquid distribution and the maintenance of such distribution throughout the packing, will homogenous mixing zones be created so as to maximize the efficiency of the overall contact operation. Efficiency is readily convertible to cost of operation and production quality. For this reason, a myriad of prior art packing designs have been prevalent in conventional exchange columns.

The efficiency of the packing, however, is limited to a large extent by the efficiency of the methodology used to distribute the vapor and liquid across the bed. For example, failure of either vapor or liquid to be evenly distributed over the entire cross-section of the bed effectively eliminates the utility of the part of the packing where there is poor or no distribution. This in turn adversely directly affects the overall cost effectiveness and efficiency of the contact operation.

The packing bed depths are critical in establishing production criteria and operational costs, and failure to evenly distribute both the vapor and the liquid across the packing and/or to maintain homogeneity within the packing can lead to serious consequences, particularly in the petroleum refining industry.

Aside from the packing beds, the liquid distributors are the most important components of the column. Failure in performance of a packed column sometimes stems from liquid distribution problems such as clogging or uneven distribution. Hence, the selection of a proper liquid distributor is critical for uninterrupted continuous operation. Operational considerations thus include the functional aspects of the distributor, such as how level the distributor troughs are maintained, how well the flow is equalized therethrough, and the means through which the liquid is distributed from the troughs to the packing beds positioned beneath the distributor. Also considered is the effect which the ascending vapor has on the liquid being distributed. When vapor flow areas are restricted, flow velocity can increase to the point of interrupting the descending flow pattern. The liquid is, in essence, "blown" around, and this condition can lead to uneven distribution and inefficiency in the operation of the column.

Conventional liquid distributors generally include the multi-orifice spray head variety adapted for dispersing liquid in the form of a spray atop a packing bed. In the utilization of dump packing wherein a plurality of randomly oriented packing elements are disposed, within the exchange column, such liquid distribution technique is sometimes effective. This is particularly true when high efficiency parameters are not of critical significance. However, in the event of high efficiency packing such as that which is described in U.S. Pat. No. 4,604,247, means for homogenous liquid and gas distribution is of extreme importance.

The cost of high efficiency packing of the type described in the '247 patent mentioned above commands attention to proper vapor-liquid distribution. Even small regions of non-homogenous interaction between the vapor and liquid is an expensive and wasteful loss not consistent with the utilization of high efficiency packing, where space and homogeneity in vapor-liquid interface is both expected and necessary for proper operation. High efficiency packings of the state of the art varieties shown in the '247 patent require counter-current vapor-liquid flow through the channels defined by the opposed corrugations of sheets. If the initial liquid or gas distribution fails to enter a particular corrugation pattern, then precious surface area is lost in the packing until the liquid and vapor are urged to migrate into and interact through the unfilled regions of the packing. Only by utilizing proper vapor and liquid distribution means may effective and efficient utilization of high efficiency packing as well as conventional dumped packing be assured.

The development of systems for adequate liquid distribution in process towers has been limited as set forth above. In the main, it is known to discharge and distribute liquids with spray orifices, pipes, perforated plates, apertured troughs and nozzles. Gas is concomitantly discharged in an ascending turbulent configuration to provide adequate vapor distribution. Although many prior art systems are generally effective in distributing some vapor and some liquid to most portions of the packing bed, uniform distribution across the entire bed is usually not obtained without more sophisticated distribution apparatus. For example, unless gas is injected into a myriad of contiguous areas beneath the packing bed with equal pressure in each area, the mass flow of vapor upwardly through the packing bed cannot be uniform. Random vapor discharge simply distributes unequal amounts of vapor across the lower regions of the packing bed but does not in any way assure equality in the distribution. Likewise the simple spray of liquid atop the packing bed, though intended to be effective in wetting all surface areas, often results in high concentrations of liquid flow in certain packing bed areas and less flow in others. This, of course, depends on the spray device. Orifice distributors are generally more susceptible to plugging than other types of distributors, and plugging is generally non-uniform to uneven irrigation within the tower. Surface irregularities in a distributor pan occurring during manufacture likewise increase flow resistance of some perforations or induce liquid flow along the bottom of the pan which is a distinct disadvantage. Any flow irregularity which focuses the flow in one area while reducing flow in other areas is deleterious.

When pipe distributors consisting of headers equipped with tributary pipes or laterals that have holes or nozzles to spray liquid are used, the liquid is often distributed too finely. Tiny droplets of the liquid then get carried out of the tower by counter-current gas flow. This may sometimes prevent the liquid from even coming into contact with the packing bed. Since liquid-vapor contact is the purpose of the packing, such a result totally frustrates the intent of the liquid distributor. As much as 5% of the liquid flowing through a nozzle can be converted to mist at a pressure drop of 20 psi. It has also been noted that nozzle equipped pipe distributors can produce overlapping spray patterns which result in increased flow in certain areas with reduced flow in other areas. Moreover, spray headers also release liquid at speeds that can cause it to pass vertically through the packing before it has a chance to spread out horizontally depending on the particular packing type.

These issues are important and often the most critical issues determining the number of liquid distribution points necessary for various tower diameters, packing heights, materials and systems. Moreover, with randomly packed beds it is critical that the packing height not be too great wherein the weight of the packing will cause it to crush itself. However, liquid redistributors between packing sections are expensive and take up heights that could otherwise be used for mass transfer. An important consideration is often the type of packing being used. For example, structured packing can tolerate very little maldistribution while dump packing on the other hand can sustain larger variations in liquid distribution.

Unfortunately, the manifestation of uneven liquid distribution generally occurs in the vicinity of the most even, or uniform, vapor distribution. The opposite is also true. This is because vapor has had a chance to more evenly distribute through the packing bed prior to engaging the liquid distribution flow. It would be an advantage, therefore, to provide even distribution for both liquid and vapor prior to entry of the vapor and liquid into the packing bed. Ideally, there should be both a uniform spread of liquid and vapor and uniform volumetric distribution in the bed.

A highly efficient liquid distributor which addresses many of the concerns discussed above is described in U.S. Pat. No. 4,909,967, the entirety of the disclosure of which is hereby specifically incorporated herein by reference thereto. The '967 patent describes an improved system of vapor-liquid distribution through a tube-trough distributor wherein each trough is constructed with a plurality of tubes that depend below the bottom region thereof so as to prevent disturbing the rise of vapor flow at the point of liquid discharge. The present invention provides even better improved results in many process applications than the distributor of the '967 patent.

SUMMARY OF THE INVENTION

The present invention addresses the problems and shortcomings of the prior art by providing a novel flow distributor for use in process columns. In particular, the invention provides a flow distributor that is of simple construction and which operates efficiently with a minimum of pressure drop so as to maximize of liquid-vapor contact in the packed bed. In accordance with its broadest aspects, the invention provides an improved flow distributor for liquid descending in a process column. The distributor includes an elongated liquid trough having first and second laterally spaced, longitudinally extending sidewalls and a longitudinally extending floor which extends between and interconnects said sidewalls. A liquid drain hole is provided in the first sidewall. The distributor also includes an elongated liquid distributor drain pipe having first and second ends and a central internal liquid conducting passageway extending therethrough from one of its ends to the other. The pipe has a first segment adjacent the first end and a second segment spaced longitudinally of the pipe from the first end and such segments are angularly disposed relative to one another. The pipe is connected to the sidewall with the passageway at the first end of the pipe in essential alignment with the drain hole, with the first segment extending laterally and outwardly away from an outer surface of the first sidewall and with the second segment extending downwardly in outwardly spaced relationship relative to such outer surface.

In accordance with one of the preferred embodiments of the invention, the distributor further may include a connector assembly that removably attaches the first end of said pipe to the first sidewall. The connector assembly may include a receptacle mounted on the first sidewall and an attachment element on the pipe at its first end. The receptacle may preferably be configured for receiving the attachment element therein and holding the pipe in its desired orientation with the passageway at the first end of the pipe in essential alignment with a corresponding drain hole with the first segment of the pipe extending laterally and outwardly away from an outer surface of the first sidewall, and with the second segment of the pipe extending downwardly in outwardly spaced relationship relative to such outer surface.

Desirably, the first sidewall may have a plurality of holes therethrough, and such holes may be spaced apart longitudinally of the distributor. In this case, the distributor may include a respective drain pipe for each hole. The distributor may also include a respective connector assembly for each drain pipe.

Ideally, each of the sidewalls may have a plurality of holes therethrough, and such holes may preferably be spaced apart longitudinally of the trough. In this case, the distributor preferably has a respective elongated liquid distributor drain pipe as described above for each of the holes. As before, the pipes may be attached to a respective sidewall with the passageway at the first end of the pipe in essential alignment with a respective hole, with the first segments extending laterally and outwardly away from an outer surface of the respective sidewall to which each pipe is attached, and with said second segments extending downwardly in outwardly spaced relationship relative to the outer surface of the respective sidewall to which the pipe is attached.

Each of the pipes may have a delivery end that is disposed at a lower elevation than the floor of the trough. The arrangement may be such that the delivery end of the pipe is disposed directly beneath the trough. Alternatively, the arrangement may be such that the delivery end of the pipe is disposed in laterally, outwardly spaced relationship relative to the trough. Ideally, the delivery ends of one group of pipes may be disposed directly beneath the trough and the delivery ends of another group of pipes may be disposed in laterally, outwardly spaced relationship relative to said trough. In its most preferred form, the distributor of the invention may include a plurality of the elongated liquid troughs and such troughs may be arranged in parallel, laterally spaced relationship.

In a particularly preferred form of the invention, the receptacle of the connector assembly may comprise a generally U-shaped channel element having a generally flat base member and a pair of generally parallel, laterally spaced flanges located on opposite side edges of the base member. The base member desirably has a hole therethrough that is in alignment with a corresponding hole in a sidewall when the receptacle is mounted in an operational position. Ideally the flanges may extend vertically when the receptacle is mounted in an operational position.

The attachment element may be in the form of a generally planar, generally rectangular plate having a lateral dimension that coincides essentially with the distance between the flanges of the channel element. Desirably, the plate and the channel element are configured such that the plate is held against the base member by the flanges. In its most efficient form, the receptacle may include a stop in the base member which contacts a lower edge of said plate to hold the plate in a proper operating position and a spring clip to hold the plate tightly against the base member.

The invention also provides a process column that includes a packed bed and a liquid flow distributor as set forth above for distributing liquid across a top face of said bed. The invention also provides a method for operating a process column that involves the steps of providing a packed bed in the column and distributing a descending flow of liquid across a top face of said bed utilizing a distributor as set forth above.

DETAILED DESCRIPTION OF PREFERRED EMBODIMENTS OF THE INVENTION

Figure 1:
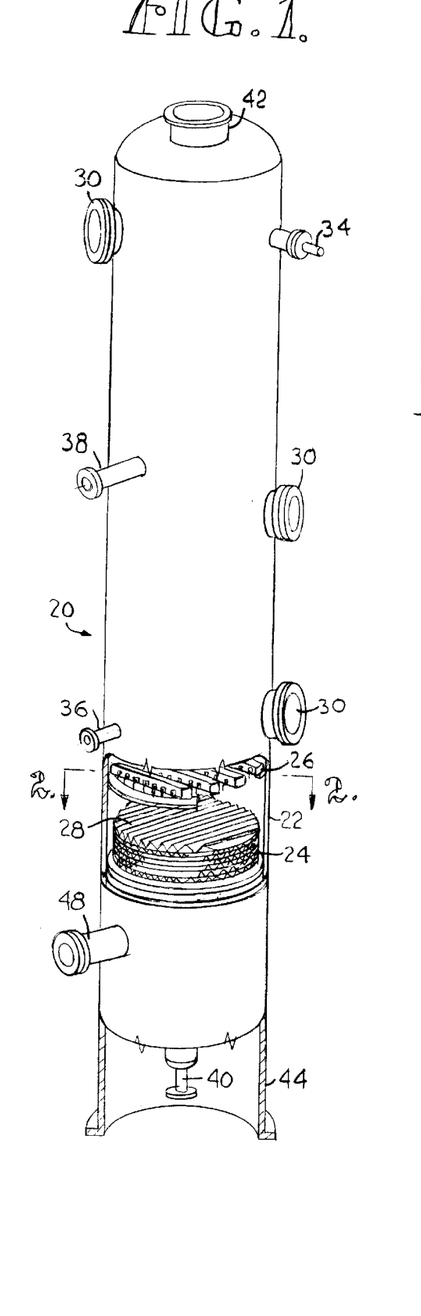
FIG. 1 is a perspective view of a packed column with various sections cut away to illustrate a variety of tower internals and an embodiment of a liquid distributor assembly constructed in accordance with the concepts and principles of the present invention.

A process column which embodies the concepts and principles of the present invention is shown schematically in FIG. 1 of the drawings where it is identified by the reference numeral 20. FIG. 1 is a perspective view of the column 20 with a portion of the outer wall 22 cut away to illustrate certain of the internals. As shown, the column 20, which desirably may be a mass and/or energy exchange column, includes a packed bed 24 and a fluid distributor 26 for distributing liquid evenly across the entire extent of the upper surface 28 of the packed bed 24. The column 20 may include a plurality of conventional manways 30 facilitating access to the internal regions of the column. The column 20 also may include conventional inlet and outlet lines of the sort which are familiar to the routineers in the process column art field.

In operation, a liquid may be fed into the tower 20 through a reflux return line 34 and a side stream input feed line 36. The liquid flows downwardly through the tower 20 and ultimately leaves the tower either at side stream draw off line 38, or at the bottom stream draw off line 40. In its downward flow, the liquid is depleted of some volatile material which evaporates from it as it passes through the internals of the column 20. Eventually the liquid flows onto the top of the distributor 26 and is then distributed evenly across the top surface of the packed bed 24.

The column 20 further may include an overhead vapor outlet line 42 disposed atop the tower 20 and a lower skirt 44 disposed in the lower region of the tower around bottom stream takeoff line 40 which may be coupled to a reboiler (not shown). A reboiler return conduit 48 may be provided above the skirt 44 for receiving recycled vapor which then flows upwardly through the packing bed 24. Condenser reflux may be introduced into the upper regions of the tower via line 34 and this reflux eventually descends to the upper regions of liquid distributor 26 from which it is distributed to the packed bed 24. As can be seen, packed bed 24 may be of the structured packing variety.

The column 20 may also include a variety of other conventional internal components as is well known to those of ordinary skill in the exchange column art field. In this regard it will be appreciated by those skilled in the art that the exact details of the internal components of the column are not critical except that the same should include a liquid distributor 26 which embodies the concepts and principles of the invention. For purposes of the invention, the distributor 26 provided thereby may be used for evenly distributing liquid descending in a tower or column across the entire horizontal cross-section of a packed bed in a tower or column and may find use in any sort of application where ascending vapors are to be brought into contact with a descending liquid in a packed bed.

Figure 2:
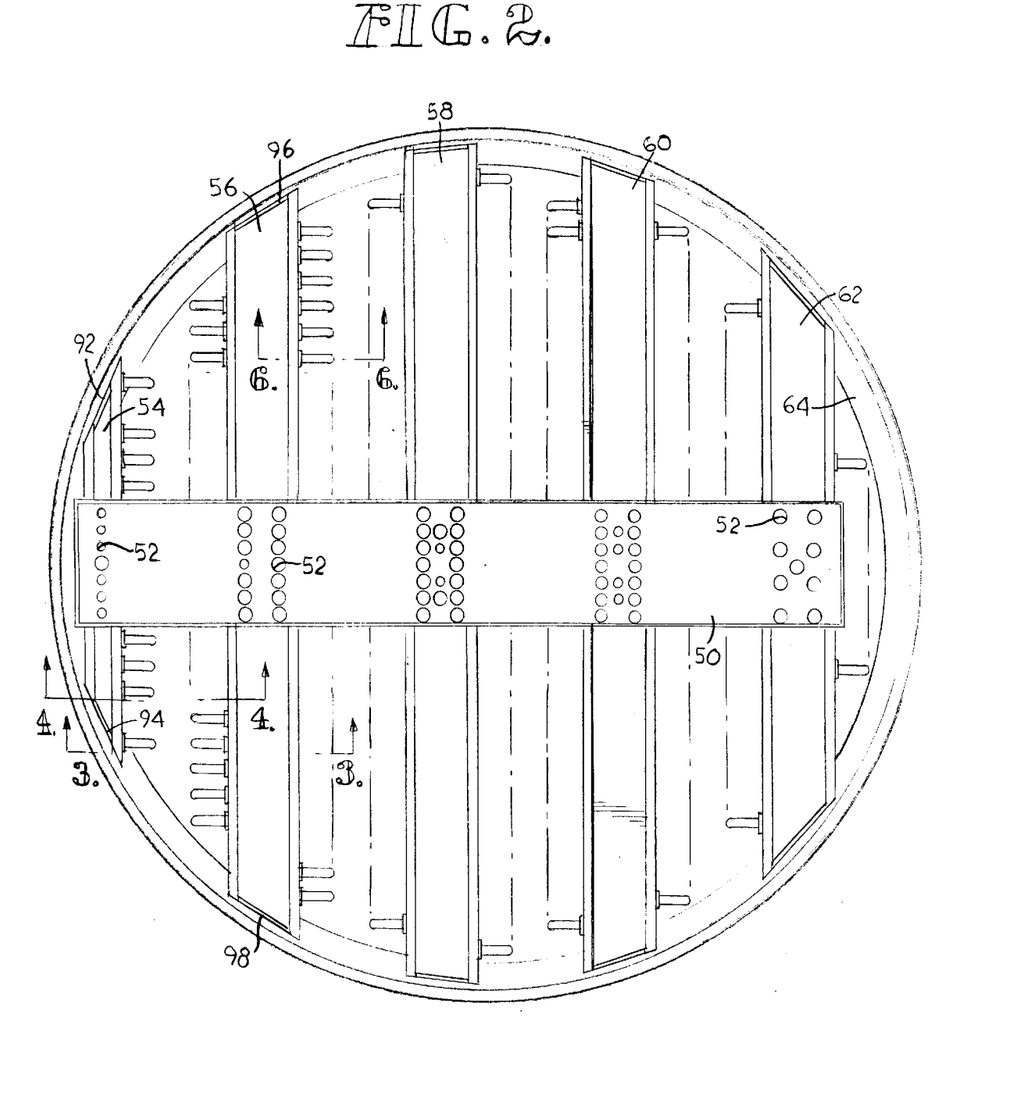
FIG. 2 is an enlarged cross-sectional view taken substantially along the line 2—2 of FIG. 1 and wherein a number of repetitive components have been eliminated for improved clarity.

Flow distributor 26, which embodies the principles and concepts of the invention, is illustrated particularly in FIG. 2. FIG. 2 is a cross-sectional view looking downwardly through the column from a vantage point directly above the distributor 26. Distributor 26 may preferably include an elongated, centrally disposed feed box 50 which receives descending liquid that has entered the column via lines 34 and 36. Tower 20 may be provided with one or more collectors (not shown) which cause the descending liquid to flow into feed box 50. Feed box 50 may desirably be provided with a multiplicity of holes 52 of varying size. Holes 52 are arranged to direct the descending liquid from feed box 50 and into an array of elongated troughs 54, 56, 58, 60 and 62 which are disposed beneath feed box 50 in respective positions to capture the liquid flowing from feed box 50 through holes 52. As shown in the drawings, troughs 54, 56, 58, 60 and 62 are arranged so as to be generally parallel relative to one another, generally perpendicular relative to feed box 50 and spaced apart in a direction along the main longitudinal axis of feed box 50. As can be seen in FIG. 2, troughs 54, 56, 58, 60 and 62 extend across the entire extent of the interior of column 20 and are supported at each end by a support ring 64 which extends circumferentially around the interior of the tower 20. Each of the troughs 54, 56, 58, 60 and 62 is elongated in a direction across column 20 that is perpendicular to feed box 50.

With particular reference to troughs 54 and 56 (see FIGS. 3 and 4), each has a pair of laterally spaced, longitudinally extending sidewalls. Thus, trough 54 has sidewalls 66 and 68 and trough 56 has sidewalls 70 and 72. Each of the troughs 54 and 56 also has a respective longitudinally extending floor. Thus, floor 82 extends across trough 54 between sidewalls 66 and 68 in interconnecting relationship thereto and floor 84 extends across trough 56 between sidewalls 70 and 72 in interconnecting relationship thereto.

Figure 3:
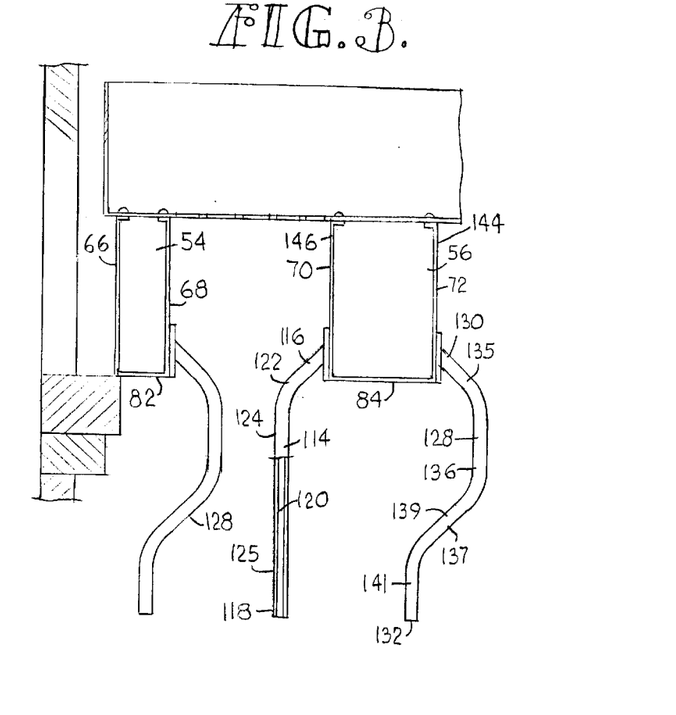
FIG. 3 is an enlarged cross-sectional view taken substantially along the line 3—3 of FIG. 2.
Figure 4:
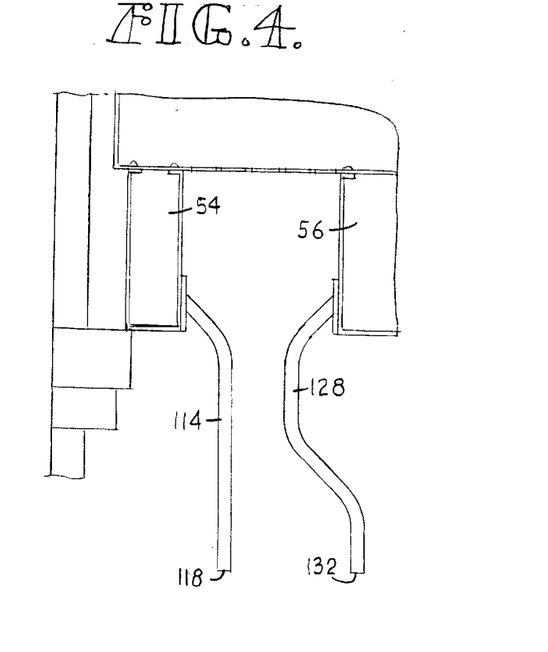
FIG. 4 is an enlarged cross-sectional view taken substantially along the line 4—4 of FIG. 2.

Each trough 54 and 56 may also preferably include a pair of longitudinally spaced end walls to form the trough and prevent liquid from escaping from its ends. Thus trough 54 has end walls 92 and 94 and trough 56 has end walls 96 and 98. It should be recognized by those skilled in the art, that although the preferred embodiment shown in the drawings includes five secondary troughs 54, 56, 58, 60 and 62, this number could just as well be greater or smaller, depending upon the requirements of a given process application.

Figure 5:
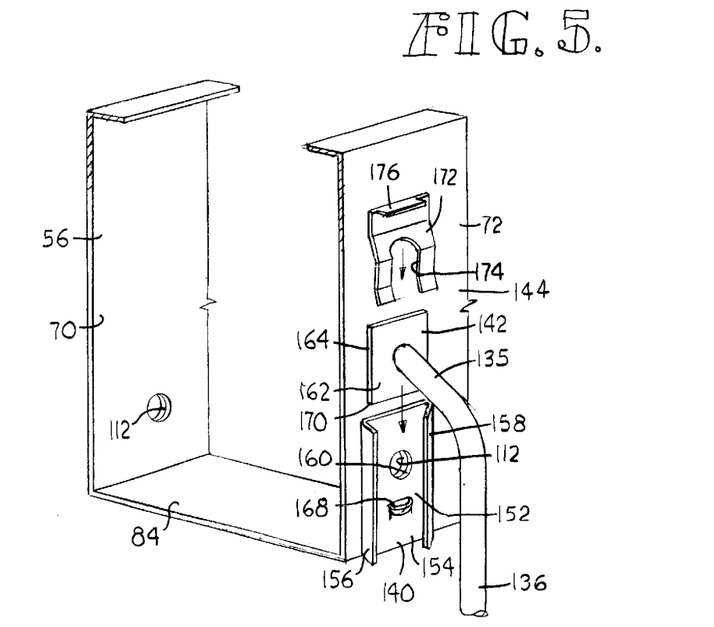
FIG. 5 is an enlarged perspective, partially exploded, cross-sectional view of a portion of a trough of the liquid distributor assembly illustrating the details of the attachment of the outlet tubes to the trough wall.

Referring now to FIGS. 3, 5, 6 and 7, it can be seen that there is a drain hole 112 which extends through the sidewall 72 of trough 56. With particular reference to FIG. 5, which is a perspective view of a horizontal cross-sectional portion of trough 56, it can be seen that there is also a drain hole 112 which extends through the sidewall 70 of trough 56. The hole 112 in sidewall 70 may be positioned directly across trough 56 from the hole 112 in sidewall 72. Alternatively, the hole in sidewall 70 may be offset longitudinally from the hole 112 in sidewall 72. In actual practice, each of the sidewalls 70 and 72 may have a multiplicity of drain holes 112 extending therethrough. Desirably the drain holes 112 in each sidewall will be spaced equidistance apart in a direction longitudinally of the trough 56 and the same will be positioned essentially the same distance above floor 84.

The distributor 26 of the invention further includes an elongated liquid distributor drain pipe 114 having an upper end 116 and a lower end 118. Pipe 114 also has a central internal liquid conducting passageway 120 which extends through pipe 114 between ends 116 and 118. Pipe 114 has a first segment 122 disposed adjacent end 116 and a second segment 124 that is spaced longitudinally of pipe 114 from end 116. As can be seen, these segments 122 and 124 are disposed at an angle relative to one another. In a particularly preferred form of the invention, segment 122 extends outwardly and downwardly away from sidewall 70 at an angle of approximately 45°; however, the exact angle is not of particular significance insofar as the invention is concerned so long as the liquid is able to drain consistently therethrough from trough 56. With particular reference to FIG. 3, it can be seen that pipe 114 also has a lower end portion 125 which extends essentially vertically from segment 124 and terminates at lower end 118.

In addition, the distributor 26 may include an elongated liquid distributor drain pipe 128 having an upper end 130 and a lower end 132. Pipe 128 also has a central internal liquid conducting passageway 134 which extends through pipe 128 between ends 130 and 132. Pipe 128, like pipe 114, has a first segment 135 disposed adjacent end 130 and a second segment 136 that is spaced longitudinally of pipe 128 from end 130. As can be seen viewing FIG. 3, these segments 135 and 136 are also disposed at an angle relative to one another. As in the case of pipe 114, segment 135 may extend outwardly and downwardly away from sidewall 72 at an angle of approximately 45°; however, once again the exact angle is not of particular significance insofar as the invention is concerned so long as the liquid is able to drain consistently from trough 56. With particular reference to FIG. 3, it can be seen that pipe 128 has a lower end portion 137 which extends downwardly from segment 136 and terminates at lower end 132. In this case, however, end portion 137 may preferably include an angled section 139 and a downwardly extending section 141. Section 139 may preferably be disposed at a downwardly inclined angle of approximately 45° relative to vertical; however, once again the exact angle is not of particular significance insofar as the invention is concerned so long as the liquid is able to drain consistently from trough 56. Section 141 extends essentially vertically from section 139 and terminates at lower end 132. It is to be noted in connection with the foregoing that angled section 139 should preferably be of sufficient length that lower end 132 is positioned directly beneath floor 84.

Figures 6, 7:
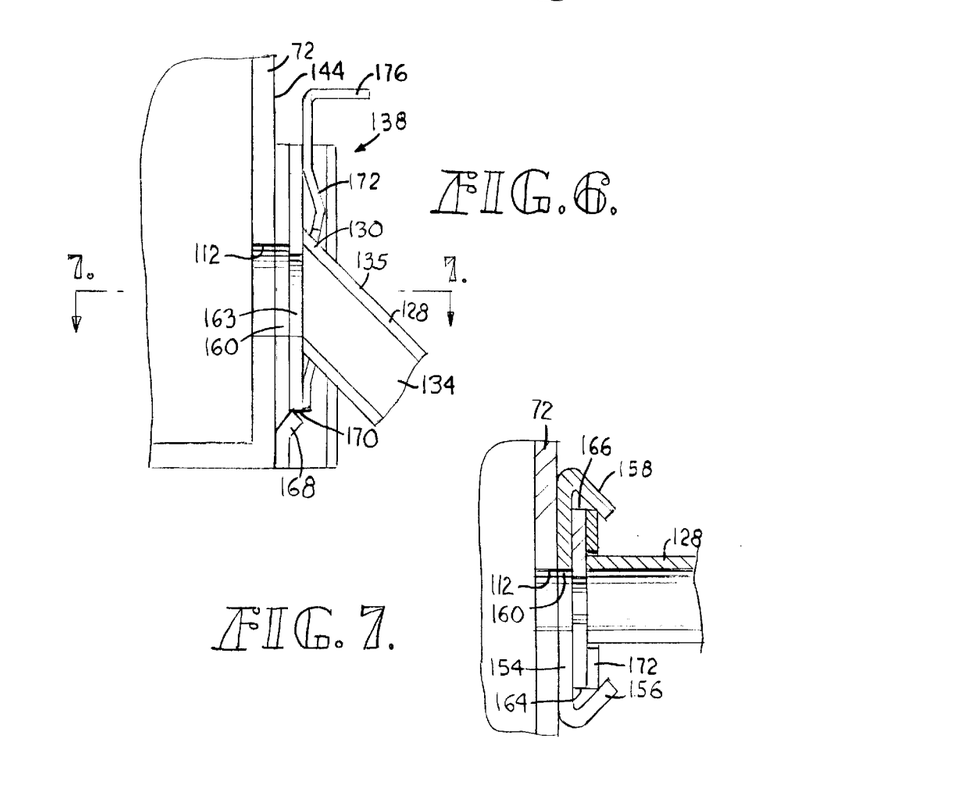
FIG. 6 is an enlarged cross-sectional view taken substantially along the line 6—6 of FIG. 2.
FIG. 7 is a cross-sectional view taken substantially along the line 7—7 of FIG. 6.

In a preferred form of the invention, the distributor 26 may include a connector assembly 138 for removably attaching the upper end 130 of pipe 128 to sidewall 72 (see FIGS. 5, 6 and 7). Connector assembly 138 may preferably include a receptacle 140 mounted on sidewall 72, and an attachment element 142 on end 130 of pipe 128. The receptacle 140 is configured for receiving attachment element 142 therein and holding pipe 128 in a desired orientation with the passageway 134 at the upper end 130 of the pipe 128 in essential alignment with hole 112, with segment 135 extending laterally and outwardly away from the outer surface 144 of sidewall 72 and with segment 136 extending downwardly in outwardly spaced relationship relative to outer surface 144.

Similarly, the distributor may include an identical connector assembly 138 for removably attaching the upper end 116 of pipe 114 to sidewall 70. In this case, the assembly 138 preferably will hold pipe 114 in a desired orientation with the passageway 120 at the upper end 116 of the pipe 114 in essential alignment with hole 112, with segment 122 extending laterally and outwardly away from the outer surface 146 of sidewall 70 and with segment 124 extending downwardly in outwardly spaced relationship relative to outer surface 146.

With reference to FIGS. 2, 3 and 4, it can be seen that in the preferred embodiment that is illustrated in the drawings, only side wall 68 of trough 54 is an active wall which carries drain pipes 114 and 128. This arrangement may be desirable to meet the operational demands of certain processes; however, it is not a necessary feature of the invention that the distributor 26 include a trough such as the trough 54 that has only a single active wall.

Desirably, there may be a plurality of drain pipes 114 and a plurality of drain pipes 128 attached to each of the sidewalls 68, 70, and 72. Needless to say, each of the sidewalls will have a drain hole 112 for draining liquid into each drain pipe 114, 128. Ideally these drain pipes 114, 128 may be disposed in alternating positions along the length of the respective sidewall, and each drain pipe 114 may be placed next to a drain pipe 128 and vice versa. Likewise, the drain pipes 114, 128 may be disposed in alternating positions in a direction that is transverse to the troughs 54 through 62. This can be seen by comparing FIGS. 3 and 4 which are respective cross-sectional views taken from different vantage points in FIG. 2. As can be seen viewing FIG. 3, each pipe 114 has a delivery end 118 that is disposed at a lower elevation than floor 82 or floor 84 as the case may be. Likewise, each pipe 128 has a delivery end 132 that is disposed at a lower elevation than floor 82 or floor 84. The delivery ends 132 are disposed directly beneath a respective floor 82, 84, while the delivery ends 118 are disposed in laterally, outwardly spaced relationship relative to the respective trough 54, 56.

Troughs 58, 60 and 62 are similar in constructional detail to trough 56 except for length and the angle of the respective end walls. Accordingly it is not believed to be necessary to describe these troughs in detail. Suffice it to say, that in the preferred embodiment of the invention that is illustrated in the drawings, each of troughs 58, 60 and 62 have two active sidewalls and each active sidewall has a plurality of holes 112 therethrough and carries a plurality of the pipes 114 and 128. It should also be noted here that in FIG. 2, many of the individual pipes 114, 128 have not been shown. This was done to avoid repetition and to improve the clarity of the illustration; however, it will be understood by those skilled in the art that there should be no substantial gaps anywhere in the distributor 26 where there is no pipe 114 or 128, since the whole purpose of the distributor of the invention is to spread the descending liquid as evenly as possible over the entire surface of the packed bed below. In this regard, in a particularly preferred form of the invention, the lower ends 118, 132 of the pipes 114, 128 should desirably be arranged on a pitch of approximately 5", both longitudinally of trough 56 through 62 and perpendicularly thereto.

Regarding the connector assembly 138, and with reference to FIGS. 5, 6 and 7, it can be seen that each receptacle 140 may desirably be in the form of a generally U-shaped channel element 152 having a generally flat base member 154 and a pair of generally parallel, laterally spaced flanges 156, 158 located on opposite side edges of the base member 154. Each base member 154 may have a hole 160 therein that is in alignment with a corresponding hole 112 in a respective sidewall when the receptacle 140 is mounted in an operational position. In this regard, it should be noted that the receptacles 140 may preferably be attached to a corresponding sidewall by welding or the like. Preferably the flanges 156, 158 are positioned so as to extend vertically when the receptacle is mounted in an operational position as shown.

The attachment element 142 may desirably be in the form of a generally planar, generally rectangular plate 162 having a lateral dimension that coincides essentially with the distance between the flanges 156, 158. Plate 162 has a hole 163 therein aligned with the passageway 120, 134, as the case may be, and the same may be attached to the upper end 116, 130 of a corresponding pipe 114, 128 by welding or the like. It is preferred that the flanges 156, 158 extend away from base member 154 at an angle, as shown in FIG. 7, that is less than perpendicular so that the same may embrace the lateral edges 164, 166 of plate 162. In this regard, the plate 162 and the channel 152 may desirably be configured such that the plate 162 may be held against base member 154 by the flanges 156, 158. A punched stop 168 may be provided in base member 154 in a position for contacting the lower edge 170 of plate 162 to hold the latter in a proper operating position. The assembly 158 may also include a spring clip 172 as shown in FIGS. 5, 6 and 7, for holding the plate 162 tightly against base member 154. Clip 172 may preferably be provided with a slot 174 to clear the respective pipe 114, 128 and a tab 176 to assist in removal of the clip 172 during disassembly of the distributor 26 for cleaning and/or maintenance.

As can be seen in FIGS. 5, 6 and 7, when the assembly 138 is fully assembled, the holes 112, 160 and 163 are in alignment so as to permit the descending liquid to flow freely from a respective trough 54, 56, 58, 60 or 62 and into a corresponding pipe 114 or 128. As will be appreciated by those skilled in the art, the rate of flow of the liquid descending from the troughs may need to be regulated. For this purpose, and as shown in FIG. 6, hole 163 may desirably have a diameter that is less than the diameters of holes 112 and 160. Thus, the flow rate of the descending liquid is controlled by the flow area of hole 163. Alternatively, the same result may be achieved by appropriately sizing one or more of the holes 112, 160 so as to have a flow area that is appropriate to the desired downward liquid flow. However, and in accordance with the preferred aspects of the invention, the liquid flow may desirably be regulated by manipulating the size of the hole 163 while providing holes 112 and 160 with more than adequate flow area. With such an arrangement, the flow rate of the descending liquid may be regulated simply by installing a pipe 114, 128 which has been equipped with a plate 162 that has a hole 163 therein having a flow area appropriate to the desired downward flow. Such an arrangement is illustrated in FIG. 6. With the arrangement of FIG. 6, the descending flow rate may conveniently be manipulated simply by changing the pipes 114, 128 and without complete disassembly of the flow distributor.

It is believed that the operation and construction of the present invention is apparent from the foregoing description. While the method and apparatus shown or described has been characterized as being preferred, it will be obvious to those skilled in the art that various changes and modifications are possible and may be made without departing from the spirit and scope of the invention as defined in the claims which follow.

I claim:

1. A flow distributor for liquid descending in a process column, said distributor comprising:

an elongated liquid trough having first and second laterally spaced, longitudinally extending sidewalls and a longitudinally extending floor which extends between and interconnects said sidewalls, said first sidewall having a hole therethrough;

an elongated liquid distributor drain pipe having first and second ends and a central internal liquid conducting passageway extending therethrough between said ends, said pipe having a first segment adjacent said first end and a second segment spaced longitudinally of the pipe from said first end, said segments being angularly disposed relative to one another, the first end of said pipe being attached to said first sidewall in a desired orientation with the passageway at the first end of the pipe in essential alignment with said hole, with said first segment extending laterally away from an outer surface of said first sidewall and with said second segment extending downwardly in outwardly spaced relationship relative to said outer surface; and a connector assembly removably attaching the first end of said pipe to said first sidewall, said connector assembly including a receptacle mounted on said first sidewall and an attachment element on said pipe at said first end, said receptacle being configured for receiving said attachment element therein and holding the pipe in said desired orientation.

2. A liquid flow distributor as set forth in claim 1, wherein said first sidewall has a plurality of holes therethrough, said holes being spaced apart longitudinally of said distributor, said distributor including a respective drain pipe for each hole.

3. A liquid flow distributor as set forth in claim 1, wherein said first sidewall has a plurality of holes therethrough, said holes being spaced apart longitudinally of said distributor, said distributor including a respective drain pipe for each hole and a respective connector assembly for each drain pipe.

4. A liquid flow distributor as set forth in claim 1, wherein said pipe has a delivery end that is disposed at a lower elevation than said floor.

5. A liquid flow distributor as set forth in claim 4, wherein said delivery end of the pipe is disposed directly beneath said floor.

6. A liquid flow distributor as set forth in claim 4, wherein said delivery end of the pipe is disposed in laterally, outwardly spaced relationship relative to said trough.

7. A liquid flow distributor as set forth in claim 2, wherein said pipes each have a delivery end that is disposed at a lower elevation than said floor.

8. A liquid flow distributor as set forth in claim 7, wherein the delivery ends of one group of said pipes are disposed directly beneath said floor and the delivery ends of another group of said pipes are disposed in laterally, outwardly spaced relationship relative to said trough.

9. A liquid flow distributor as set forth in claims 3, wherein said pipes each have a delivery end that is disposed at a lower elevation than said floor.

10. A liquid flow distributor as set forth in claim 9, wherein the delivery ends of one group of said pipes are disposed directly beneath said floor and the delivery ends of another group of said pipes are disposed in laterally, outwardly spaced relationship relative to said trough.

11. A liquid flow distributor as set forth in claim 1, wherein is included a plurality of said elongated liquid troughs.

12. A liquid flow distributor as set forth in claim 11, wherein said troughs are arranged in parallel, laterally spaced relationship.

13. A liquid flow distributor as set forth in claim 1, wherein said receptacle comprises a generally U-shaped channel element having a generally flat base member and a pair of generally parallel, laterally spaced flanges located on opposite side edges of the base member.

14. A liquid flow distributor as set forth in claim 13, wherein said base member has a hole therethrough that is in alignment with a corresponding hole in a sidewall when the receptacle is mounted in an operational position.

15. A liquid flow distributor as set forth in claim 14, wherein said flanges extend vertically when the receptacle is mounted in said operational position.

16. A liquid flow distributor as set forth in claim 15, wherein said attachment element comprises a generally planar, generally rectangular plate having a lateral dimension that coincides essentially with the distance between said flanges, said plate and said channel being configured such that said plate is held against said base member by said flanges.

17. A liquid flow distributor as set forth in claim 16, wherein said receptacle includes a stop in said base member which contacts a lower edge of said plate to hold the plate in a proper operating position.

18. A process column comprising a packed bed and a liquid flow distributor as set forth in claim 1 for distributing liquid across a top face of said bed.

19. A method for operating a process column comprising providing a packed bed in said column and distributing a descending flow of liquid across a top face of said bed utilizing a distributor as set forth in claim 1.

20. A flow distributor as set forth in claim 1, wherein said receptacle and said attachment element each has a respective hole therein, which holes are in alignment with the hole in said sidewall, the hole in said attachment element having a smaller open area than the holes in the receptacle and the sidewall, whereby flow of liquid from said trough and into said pipe is restricted by the hole in said attachment element.

21. A method for operating a process column comprising providing a packed bed in said column and distributing a descending flow of liquid across a top face of said bed utilizing a distributor as set forth in claim 20.

22. A flow distributor for liquid descending in a process column, said distributor comprising:

an elongated liquid trough having first and second laterally spaced, longitudinally extending sidewalls and a longitudinally extending floor which extends between and interconnects said sidewalls, said sidewalls each having a plurality of holes therethrough, the holes of each sidewall being spaced apart longitudinally of said distributor;

a respective elongated liquid distributor drain pipe for each of said holes, each said pipe having first and second ends and a central internal liquid conducting passageway extending therethrough between said ends, said pipes each having a first segment adjacent said first end and a second segment spaced longitudinally of the pipe from said first end, said segments being angularly disposed relative to one another, each of said pipes being attached to a respective sidewall in a desired orientation with the passageway at the first end of the pipe in essential alignment with a respective hole, with said first segment extending laterally away from an outer surface of the respective sidewall to which the pipe is attached, and with said second segment extending downwardly in outwardly spaced relationship relative to said outer surface of the respective sidewall to which the pipe is attached; and a respective connector assembly for each of said pipes, said assemblies removably attaching the first ends of said pipes to a respective sidewall, said connector assemblies each including a receptacle mounted on a sidewall and an attachment element on a corresponding pipe at said first end thereof, said receptacles each being configured for receiving a respective attachment element therein and holding a corresponding pipe in said desired orientation.

23. A liquid flow distributor as set forth in claim 22, wherein said pipes each have delivery ends that are disposed at a lower elevation than said floor.

24. A liquid flow distributor as set forth in claim 23, wherein the delivery ends of one group of said pipes are disposed directly beneath said floor and the delivery ends of another group of said pipes are disposed in laterally, outwardly spaced relationship relative to said trough.

25. A liquid flow distributor as set forth in claim 24, wherein is included a plurality of said elongated liquid troughs.

26. A liquid flow distributor as set forth in claim 25, wherein said troughs are arranged in parallel, laterally spaced relationship.

27. A liquid flow distributor as set forth in claim 22, wherein is included a plurality of said elongated liquid troughs.

28. A liquid flow distributor as set forth in claim 27, wherein said troughs are arranged in parallel, laterally spaced relationship.

29. A liquid flow distributor as set forth in claim 22, wherein each of said receptacles comprises a generally U-shaped channel element having a generally flat base member and a pair of generally parallel, laterally spaced flanges located on opposite side edges of the base member.

30. A liquid flow distributor as set forth in claim 29, wherein each said base member has a hole therethrough that is in alignment with a corresponding hole in a sidewall when the receptacle is mounted in an operational position.

31. A liquid flow distributor as set forth in claim 30, wherein said flanges extend vertically when the receptacles are mounted in said operational position.

32. A liquid flow distributor as set forth in claim 31, wherein said attachment element comprises a generally planar, generally rectangular plate having a lateral dimension that coincides essentially with the distance between said flanges, said plate and said channel being configured such that said plate is held against said base member by said flanges.

33. A liquid flow distributor as set forth in claim 32, wherein said receptacle includes a stop in said base member which contacts a lower edge of said plate to hold the plate in a proper operating position.

34. A process column comprising a packed bed and a liquid flow distributor as set forth in claim 26 for distributing liquid across a top face of said bed.

35. A process column comprising a packed bed and a liquid flow distributor as set forth in claim 22 for distributing liquid across a top face of said bed.

36. A method for operating process column comprising providing a packed bed in said column and distributing a descending flow of liquid across a top face of said bed utilizing a distributor as set forth in claim 26.

37. A method for operating a process column comprising providing a packed bed in said column and distributing a descending flow of liquid across a top face of said bed utilizing a distributor as set forth in claim 22.

* * * * *